(12) United States Patent
Cullinan

(10) Patent No.: US 7,001,052 B2
(45) Date of Patent: Feb. 21, 2006

(54) VEHICLE TRAILER LIGHTING SYSTEM

(76) Inventor: John K. Cullinan, 1832 Banbury Rd., Charleston, SC (US) 29414

( * ) Notice: Subject to any disclaimer, the term of this patent is extended or adjusted under 35 U.S.C. 154(b) by 155 days.

(21) Appl. No.: 10/650,568

(22) Filed: Aug. 28, 2003

(65) Prior Publication Data

US 2005/0047156 A1    Mar. 3, 2005

(51) Int. Cl.
*B60Q 1/00* (2006.01)
(52) U.S. Cl. .................. 362/485; 362/540; 362/549; 362/498; 362/499; 362/541; 362/542
(58) Field of Classification Search ............... 362/485, 362/543, 541, 540, 549, 498, 499, 542; 340/431, 340/307
See application file for complete search history.

(56) References Cited

U.S. PATENT DOCUMENTS

| | | | | |
|---|---|---|---|---|
| 1,415,465 A | * | 5/1922 | Nigh | 362/494 |
| 1,498,088 A | * | 6/1924 | Frascadore et al. | 362/540 |
| 2,719,967 A | * | 10/1955 | Donley | 340/815.41 |
| 2,738,414 A | * | 3/1956 | Davis et al. | 362/540 |
| 2,739,224 A | * | 3/1956 | Knapp | 362/540 |
| 3,683,842 A | * | 8/1972 | Logan | 362/542 |
| 3,788,502 A | | 1/1974 | Bell | |
| 3,822,899 A | | 7/1974 | Slack | |
| 3,885,146 A | * | 5/1975 | Whitley, Jr. | 362/485 |
| 3,887,093 A | * | 6/1975 | Howell | 414/532 |
| 4,286,309 A | * | 8/1981 | Rasinski | 362/549 |
| 4,395,749 A | | 7/1983 | Poveromo | |
| 4,519,738 A | * | 5/1985 | Wood | 414/483 |
| 4,715,768 A | * | 12/1987 | Capps | 414/535 |
| 5,114,168 A | | 5/1992 | Kehl | |
| D351,115 S | * | 10/1994 | Valdez | D10/114 |
| 5,544,022 A | | 8/1996 | Blackard | |
| 5,596,944 A | * | 1/1997 | Massie | 116/28 R |
| 6,302,567 B1 | * | 10/2001 | Gamble, Sr. | 362/505 |
| 6,322,238 B1 | * | 11/2001 | Barr | 362/543 |
| 6,409,367 B1 | * | 6/2002 | Pratt | 362/505 |
| 6,734,792 B1 | * | 5/2004 | McElveen | 340/468 |
| 2003/0128105 A1 | * | 7/2003 | Shaw | 340/431 |

* cited by examiner

*Primary Examiner*—John Anthony Ward
*Assistant Examiner*—Jacob Y. Choi
(74) *Attorney, Agent, or Firm*—B. Craig Killough

(57) ABSTRACT

A trailer for vehicles having trailer lights that are mounted on stanchions present on the left rear and right rear corners of the trailer. An electrical light is mounted at an elevation so that the driver can see the front of the electrical light from the driver's seat of the towing vehicle. The electrical light is formed so that light is emitted both toward the rear of the trailer and toward the front of the trailer. The housing for the electrical light comprises concave lenses that are positioned so as to be resistant to breaking.

13 Claims, 2 Drawing Sheets

VEHICLE TRAILER LIGHTING SYSTEM

FIELD OF THE INVENTION

This invention relates to trailers for hauling vehicles generally, and is more specifically directed to a vehicle trailer lighting system.

BACKGROUND OF THE INVENTION

Vehicles, such as boats, other watercraft, and snowmobiles are transported and conveyed on trailers. Trucks and automobiles tow trailers having vehicles mounted thereon.

Trailers in common use have at least one (1) taillight that is typically mounted to the rear of the trailer. Commonly, the light is mounted on a lower, rear portion of the trailer. The positioning of the light or lights subjects the lights to being easily broken, since the low position of the light leaves it vulnerable to striking objects that are located near the ground, particularly when the trailer is moving backwards, and the driver cannot see objects that are near the ground.

Further, and particularly with boat and other watercraft trailers, the lights are frequently submersed in water, as a boat is loaded and unloaded from the trailer. Water generally, and saltwater more specifically, is particularly damaging to these electrical lights. Still further, the position of the lights does not assist or benefit the driver of the vehicle in locating the rear corners of the trailers. The lights are typically mounted too low on the trailers to be seen from the driver's seat, and even if mounted higher, the light so emitted is directed toward the rear of the trailer.

SUMMARY OF THE PRESENT INVENTION

The present invention is a trailer for vehicles having a novel lighting system. The trailer lights are mounted on stanchions that are present on the left rear and right rear corners of the trailer. An electrical light is mounted on each of the stanchions at an elevation so that the driver can see the front of the electrical light from the driver's seat of the towing vehicle. The electrical light is formed so that light is emitted both toward the rear of the trailer and toward the front of the trailer. The housing for the electrical light comprises concave lenses that are positioned so as to be resistant to breaking.

DETAILED DESCRIPTION OF THE PREFERRED EMBODIMENT

Figure 1:
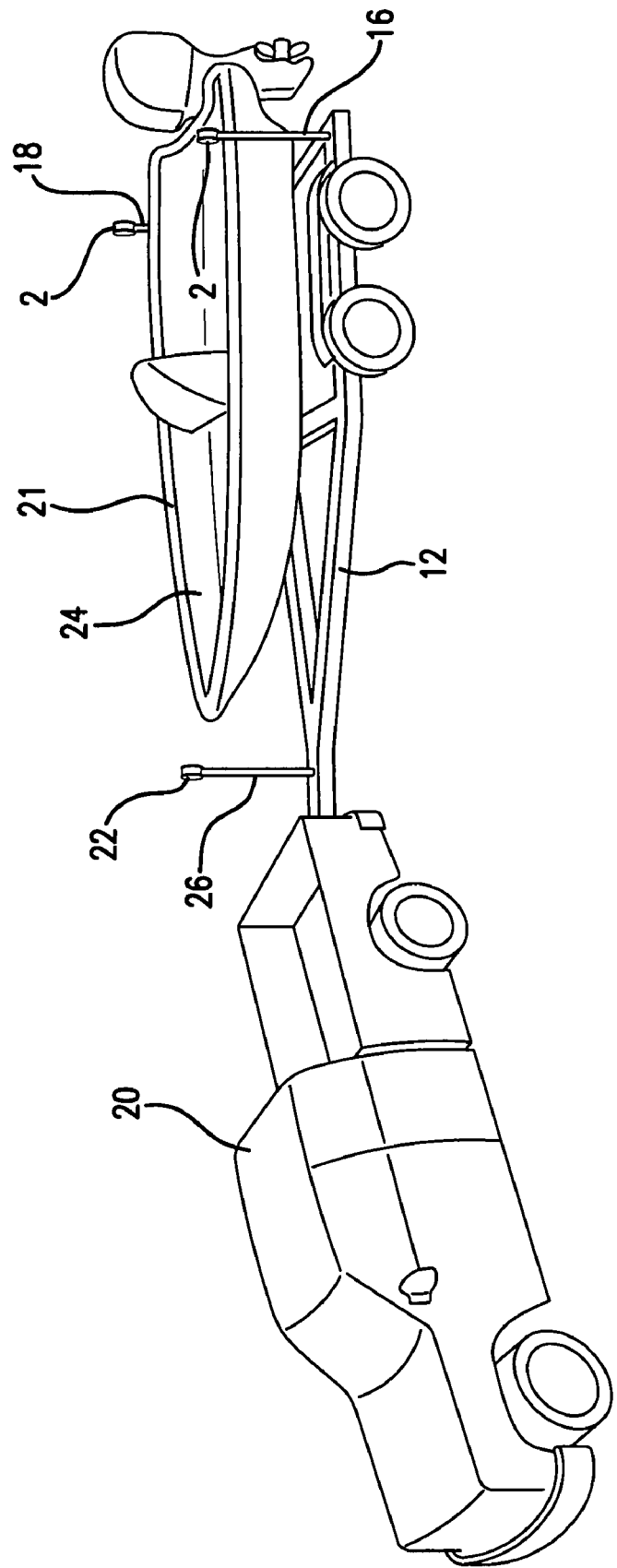
FIG. 1 is a perspective view of a trailer having the lighting system of the present invention. As shown, a boat is mounted on the trailer, and a towing vehicle is connected to the trailer.
Figures 2, 3:
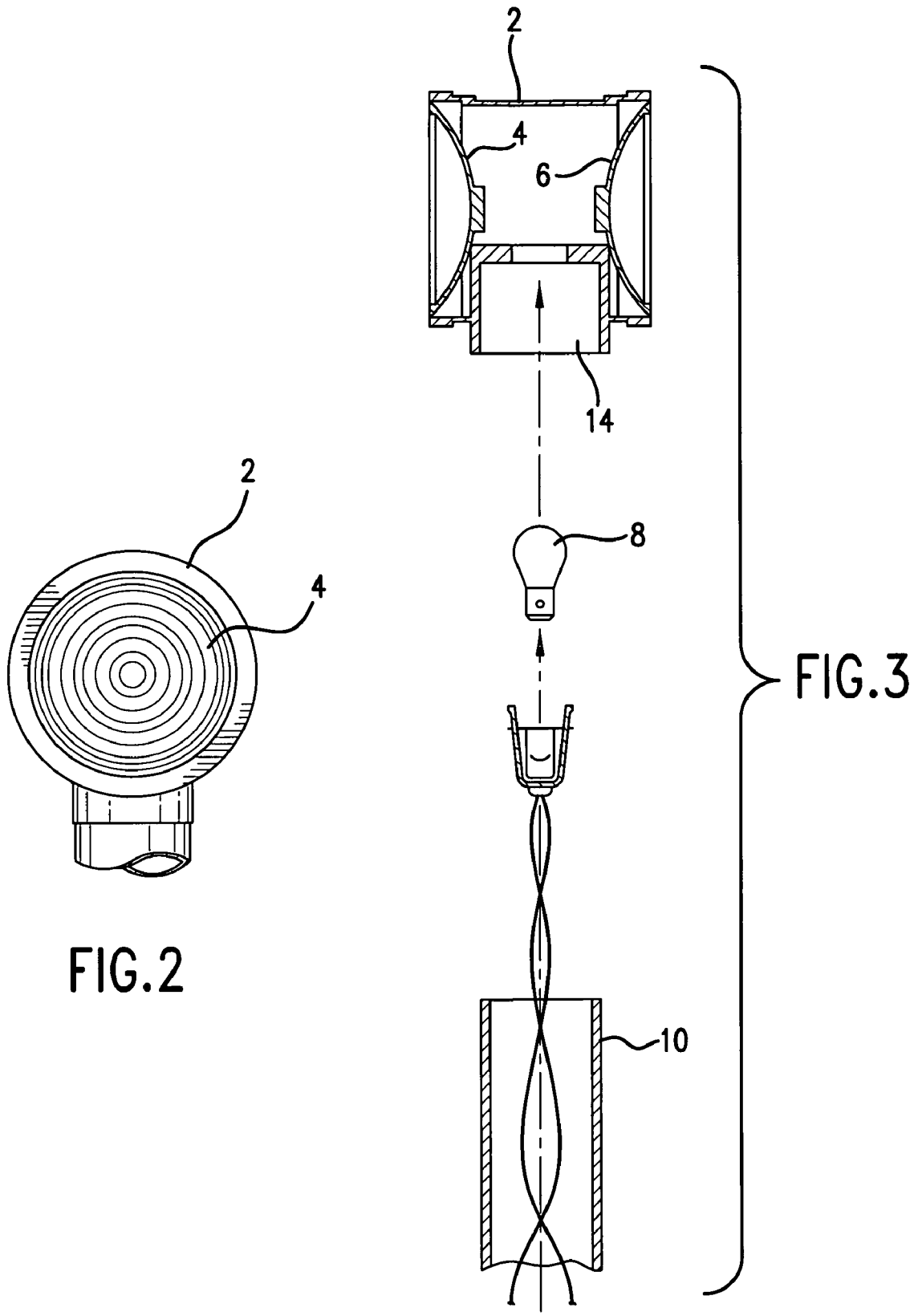
FIG. 2 is an elevation of the electrical light of the invention.
FIG. 3 is an exploded view of the electrical light of the invention.

Referring now to the drawing figures, the electrical light of present invention is shown in FIG. 2. The housing 2 for the electrical light is preferred to be circular as shown in the elevation of FIG. 2. A concave lens 4 is present in the front of the housing, and another concave lens 6 is present in the rear of the housing. In a preferred embodiment, the front concave lens 4 is amber in color, while the rear concave lens 6 is red in color. A light source, such as an electrical light bulb 8, is inserted into the housing between the front concave lens and the rear concave lens. Other light emitting devices could be used as the light source, such as multiple filament incandescent bulbs, light emitting diodes, or lasers. Typically, the light bulb will operate from the electrical power provided by the vehicle towing the trailer, and will operate at 12 volts direct current (DC), or 24 volts DC.

The lenses are concave so as to be resistant to breaking. The concave shape causes the lens extends into the housing, rather than away from the housing. In this way, the housing protects the lenses from breakage. As shown in FIG. 3 it is preferred that the entire lens is recessed within the housing, so that the lens does not extend materially beyond the edge of the housing.

The electrical light direct lights toward the rear of the trailer and toward the front of the trailer, with light emitted from a single bulb. Alternatively, multiple light bulbs may be used. A bulb may be provided for the front concave lens, with a separate bulb provided for the rear concave lens. Light bulbs having multiple filaments may be used.

The housing may be formed of molded plastic. The lenses may be formed of translucent molded plastic. It is preferred that the housing have a gasket or sealant between the lenses and the housing, to keep water away from the lamp, even though the housing will be mounted on the trailer above the water line of the trailer.

The light is mounted on stanchions 10 that extend generally vertically from the trailer 12. Stanchions may be formed of PVC pipe that is inserted into a female receptacle 14 within the housing. The stanchions may be formed of other elongated materials, such as rods or pipes formed or metal, fiberglass or plastic, it being preferred that the stanchions are corrosion resistant and have a high strength to weight relationship. An additional conduit may be inserted into the stanchion. For example, the stanchion may be formed of two-inch (2") PVC pipe, while the conduit is one and one-half (1½") inch PVC pipe.

It is preferred that a stanchion 16 be mounted on or near the right rear of the trailer, with an additional stanchion 18 mounted on or near the left rear of the trailer. Each of these stanchions will have an electrical light housing 2 electrical light assembly as described above, with the housing mounted on the top of the stanchion. The stanchions are positioned so that the front concave lens, such as the amber lens, is visible from the driver's seat of the vehicle towing the trailer.

The elevation provided by the stanchion insures that, as watercraft are unloaded from the trailer, and the rear of the trailer enters the water, the lights are not submerged in the water. By positioning the lights on stanchions on each rear corner of the trailer, the operator of the vehicle can verify the location of the rear of the trailer by visually locating the lights while sitting in the driver's seat of the towing vehicle 20. This assists the driver of the towing vehicle in locating the rear of the trailer when backing the trailer for loading or unloading the watercraft, and is particularly useful at night. The use of amber lenses on the front side of the housing avoids glare in the driver's eyes, and does not confuse drivers of other vehicles with regard to the direction of travel of the trailer. Rather, the use of amber lenses gives oncoming drivers warning that a trailer is following the vehicle, and also gives an indication of the length of the trailer, which is a feature not typically found in vehicle trailers. The lights should be mounted at a sufficient height so that the lights are visible from the driver's seat of the vehicle, either directly, or by means of the rear view mirrors of the vehicle. This positioning also allows the driver to verify that the lights are working, without the necessity of leaving the driver's seat. The stanchions should also be of sufficient height so that the lights are above the gunwale 21 of the boat that is being towed on the trailer.

In one embodiment of the present invention, an additional light 22 is mounted on the trailer near the front of the trailer, and ahead of the vehicle 24 that is being towed. The additional light is generally centered on the trailer. The additional light is mounted on a stanchion 26, as discussed above, so that the light is visible from the driver's seat of the towing vehicle. This third electrical light may have the same housing and lens structure as described above, or it may have only a single concave lens. If a single lens is used, the light is directed toward the front of the trailer, so that it is visible from the driver's seat.

The third light has a lens that is visible to the driver and is preferred to have of a color that differs from the front concave lens of the rear lights, so that it is distinguishable from the rear lights. The third electrical light could have a clear lens, so that a white light is directed toward the driver.

In use, the third light assists the driver of the vehicle in backing the trailer. This structure is particularly useful at night. The driver of the vehicle can keep the white light centered between the amber lights, thereby assisting the driver in backing the trailer in a straight line. With practice, the center and third light will assist the driver in measuring the degree of turn of the trailer at night. As the driver notes the relative position of the white light to one or the other of the rear lights, the degree of turn that the trailer is making relative to the towing vehicle may be visually measured.

Similarly, the third light assists the operator of a vehicle to be towed in driving the vehicle onto the trailer at night. In particular, a boat or other watercraft may be driven onto a submerged trailer. The boat operator can center the white light between the red lights to properly center and align the boat on the trailer. The stanchions keep the lights above the water, even when most of the trailer is submerged for loading.

What is claimed is:

1. A vehicle trailer lighting system, comprising:
   a first stanchion that is located on a rear portion of a vehicle trailer and on a right portion of said vehicle trailer, said first stanchion extending upwardly from said vehicle trailer;
   a second stanchion located on a rear portion of a vehicle trailer and on a left portion of said vehicle trailer, said second stanchion extending upwardly from said vehicle trailer;
   a first electrical light that is present within a housing, said housing having a rear concave and colored lens on a rear thereof and having a front concave and colored lens on a front thereof, whereby light that is emitted by said first electrical light is visible through said rear concave and colored lens and is visible through said front concave and colored lens, and wherein said housing is mounted on said stanchion and said front concave and colored lens is viewable from a driver's seat of a towing vehicle; and
   a second electrical light that is present within a housing, said housing having a rear concave and colored lens on a rear thereof and a front concave and colored lens on a front thereof, whereby light that is emitted by said second electrical light is visible through said rear concave and colored lens and light that is emitted by said second electrical light is visible through said front concave and colored lens, and wherein said housing is mounted on said stanchion and said front concave and colored lens is viewable from a driver's seat of said towing vehicle.

2. A vehicle trailer lighting system as described in claim 1, further comprising a third stanchion located on a front portion of a vehicle trailer at a center portion of said vehicle trailer, said third stanchion extending upwardly from said vehicle trailer, and a third electrical light that is mounted on said stanchion, wherein light that is emitted by said second electrical light is directed towards a front of said trailer.

3. A vehicle trailer lighting system as described in claim 2, wherein said third electrical light emits a white light that is directed towards and is visible from the front of said trailer.

4. A vehicle trailer lighting system as described in claim 2, wherein said third electrical light is present within a housing, said housing having a front concave lens.

5. A vehicle trailer lighting system as described in claim 4, wherein said front concave lens of said third electrical light does not extend outwardly beyond said housing of said third electrical light.

6. A vehicle trailer lighting system as described in claim 1, wherein said rear concave and colored lens of said first electrical light is red, and said front concave and colored lens of said first electrical light is amber.

7. A vehicle trailer lighting system as described in claim 1, wherein a vehicle that is present on said vehicle trailer is a boat, and wherein said housing of said first electrical light and said housing of said second electrical light are positioned above a gunwale of said boat.

8. A vehicle trailer lighting system as described in claim 1, wherein rear concave and colored lens of said first electrical light does not extend outwardly beyond said housing of said first electrical light and said front concave and colored lens of said first electrical light does not extend outwardly beyond said housing of said first electrical light.

9. A vehicle trailer lighting system as described in claim 8, wherein rear concave and colored lens of said second electrical light does not extend outwardly beyond said housing of said second electrical light and said front concave and colored lens of said second electrical light does not extend outwardly beyond said housing of said second electrical light.

10. A vehicle trailer lighting system as described in claim 1, wherein said housing of said first electrical light is mounted over a top of said first stanchion.

11. A vehicle trailer lighting system as described in claim 1, wherein rear concave and colored lens of said second electrical light does not extend outwardly beyond said housing of said second electrical light and said front concave and colored lens of said second electrical light does not extend outwardly beyond said housing of said second electrical light.

12. A vehicle trailer lighting system as described in claim 1, wherein said housing of said second electrical light is mounted over a top of said first stanchion.

13. A vehicle trailer lighting system as described in claim 12, wherein said housing of said first electrical light is mounted over a top of said first stanchion.

* * * * *